April 28, 1931.  R. W. EATON  1,802,635
SOLAR WATER HEATER
Filed Oct. 17, 1929   2 Sheets-Sheet 1
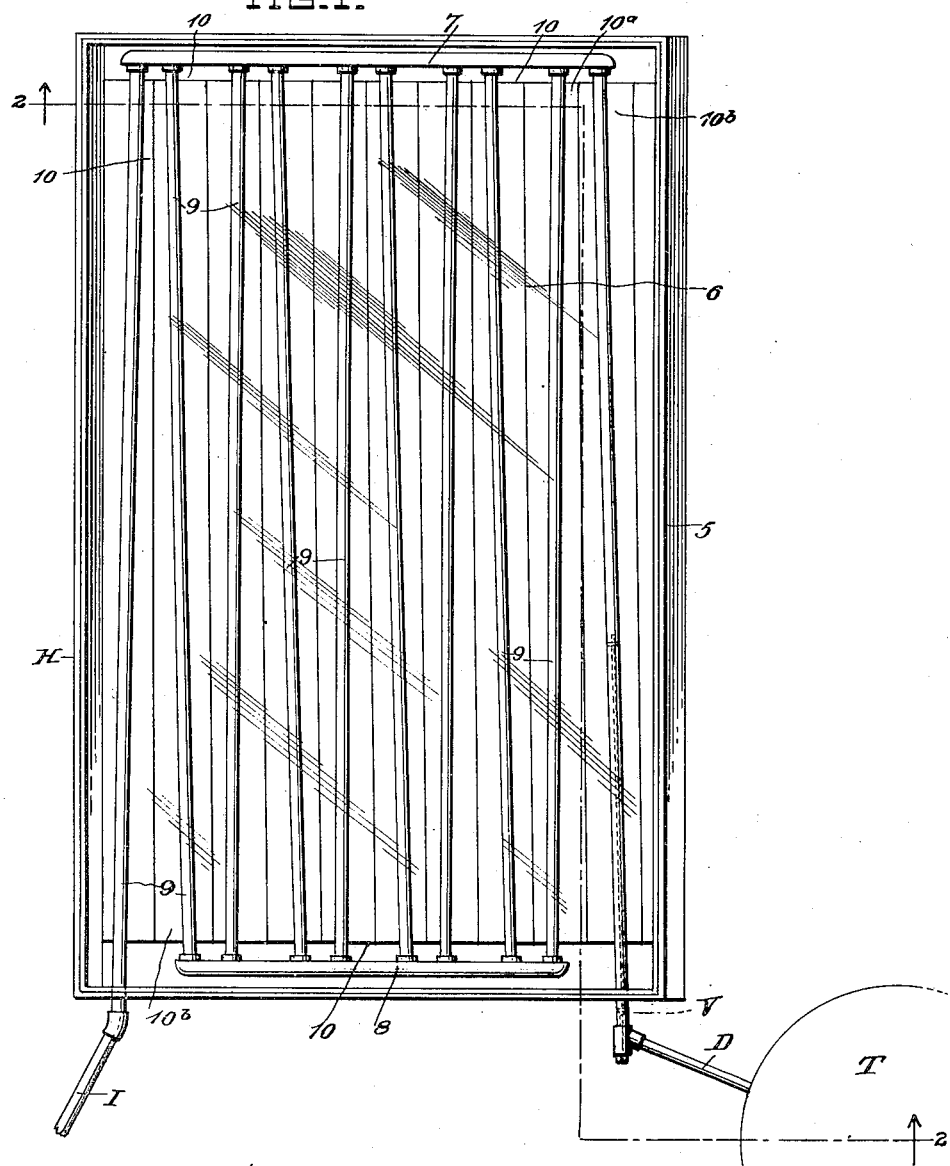
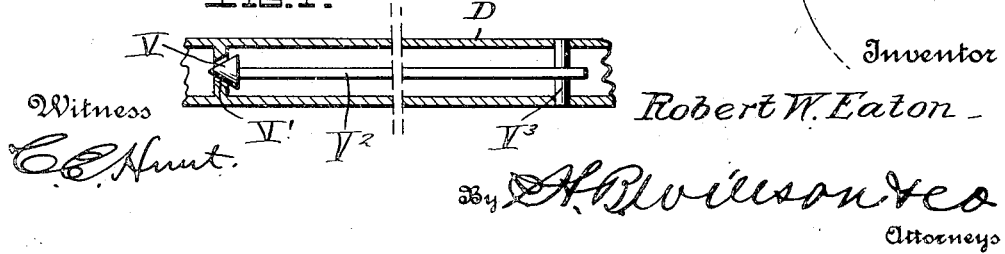

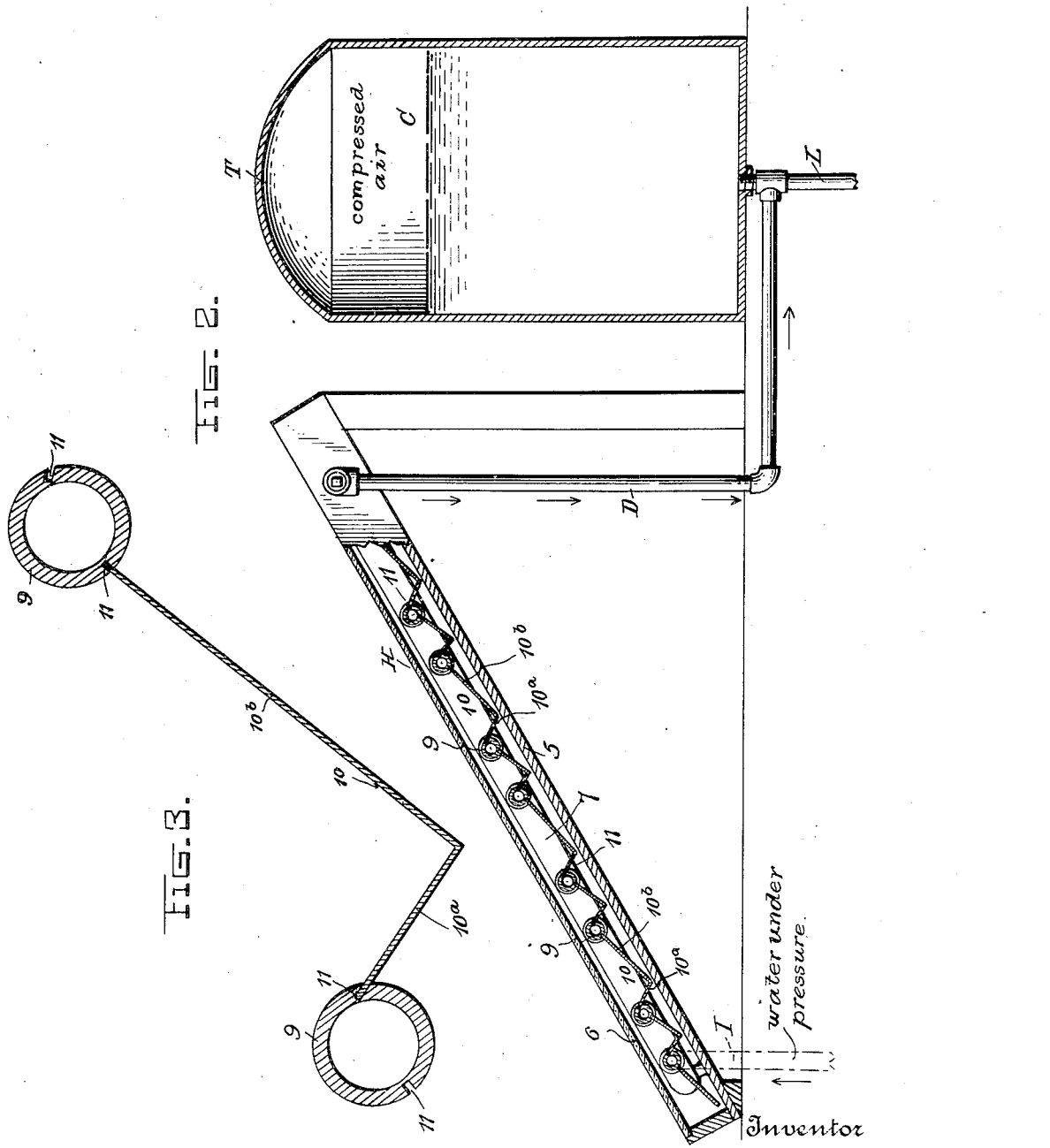

Patented Apr. 28, 1931

1,802,635

UNITED STATES PATENT OFFICE

ROBERT W. EATON, OF MIAMI, FLORIDA, ASSIGNOR TO FRANK J. BENTZ, OF MIAMI, FLORIDA

SOLAR WATER HEATER

Application filed October 17, 1929. Serial No. 400,337.

The invention relates to solar water heating systems in which water which is heated by a sun-heated heater, is supplied to said heater under pressure and is conducted from said heater to a storage tank communicating with a discharge line to the various spigots. Heretofore, it has been proposed to provide automatic valve means for preventing further discharge of water from the heater to the storage tank after sun-down when said heater possesses no heating efficiency, hot water from the storage tank being discharged by gravity after closing of said valve means, until the following day when the heater will again perform efficiently. It is one aim of the present invention however to provide a storage tank whose upper portion constitutes an air chamber, in which air is compressed by entrance of the hot water under pressure into said tank during the day time. Hence, after closing of the valve means which prevents further discharge of water from the heater into the tank, the trapped compressed air in the upper portion of said tank will act for the purpose of discharging the hot water under pressure each time a spigot is opened, producing much better results than when the hot water is allowed to discharge only by gravity. When such gravity discharge is employed, it is necessary to provide the upper portion of the storage tank with an automatic air valve which admits air during discharge of water, and upon refilling of the tank permits discharge of air until said tank is full. The necessity of such a valve is also overcome with the improved system.

A further object of the invention is to provide an unusually efficient sun-heated heater of such construction that any hot water therein may readily ascend, whereas any relatively cool water may descend or remain in the heater for further heating.

A still further object is to provide sun-heated plates of novel form for absorbing the heat and conducting it to the sun-heated pipes which contain the water to be heated.

Yet another object is to make novel provision for connecting the sun-heated plates with the pipes in an effective manner and for permitting any required relative movement between pipes and plates, incident to expansion and contraction.

With the foregoing in view, the invention resides in the novel subject matter hereinafter described and claimed, description being accomplished by reference to the accompanying drawings.

Fig. 1 is a top plan view of a heating system constructed in accordance with my invention.

Fig. 2 is a vertical sectional view partly in elevation as indicated by the irregular line 2—2 of Fig. 1.

Fig. 3 is an enlarged sectional view showing more clearly the connection between one of the sun-heated plates and two of the water-heating pipes.

Fig. 4 is a horizontal sectional view through the thermostatic valve which controls the discharge of water from the heater into the hot water storage tank.

In the drawings above briefly described, H denotes a sun-heated water heater having an inlet I for water under pressure from either a domestic or city water system. A hot water discharge pipe D leads from the highest point of the heater H to a hot water storage tank T, and a hot water discharge line L leads from said tank T to the various spigots (not shown). A valve V is provided, capable of preventing flow of water under pressure from the heater H to the tank T. This valve is preferably of thermostatic nature and while its construction forms no part of my invention, it may be briefly described as follows: The valve V is conical and coacts with a seat $V^1$ in pipe D, said valve being carried by a rod $V^2$ which is pinned at $V^3$ to said pipe. Rod $V^2$ has a lower coefficient of expansion than the pipe D and hence expansion of said pipe under the influence of hot water therein, opens the valve, while cooling of the water effects valve closing. Hence, the valve will remain closed during the night and will not admit any cold water into the tank in case hot water should be drawn from the latter, with the result that the stored hot water may be kept for a longer period than would otherwise be possible, usually until the next morning.

The upper portion of the tank T constitutes a compressed air chamber C and whenever hot water under pressure flows from the heater H into the tank T, it compresses air in this chamber, the air being raised to a pressure corresponding with that under which the water is supplied through the inlet I. When the valve V is closed, for instance, at sun-down, and water under pressure cannot therefore flow to the tank T, the compressed air in the chamber C stands in readiness to discharge the hot water from said tank under pressure, any time a spigot of the line L is opened. Thus, any time a spigot is opened after closing of the valve V, for instance, during the night, the hot water will be discharged under pressure, and sufficient hot water may be held over for the next morning's use. The valve V is restored to open position when the heater H can next continue to efficiently operate and hence the tank T will refill with hot water and the air will again be compressed. Opening of the spigot during the day time, if the valve V be open, will insure hot water direct from the heater H. If, however, at the time of opening the spigot, the valve V be closed, hot water under pressure will be discharged from the tank T, the pressure being furnished by the compressed air in the chamber C.

It will be seen from the above that I have provided very advantageous improvements in solar hot water systems, regardless of the construction of the heater H or the type of valve V, it being possible if desired to make use of a manually controlled valve, simply closing it at night and opening it in the morning. Even though any adequate type of solar heater H could be employed in the system, said heater is preferably of the construction disclosed, on account of the unusual efficiency of such construction.

The numeral 5 denotes a shallow inclined casing of any desired material and construction and preferably provided with a glass top 6. Supported in any desired way in the ends of this casing, are two horizontally spaced inclined manifolds 7 and 8. The inlet I leads directly to one end of the manifold 7 and the discharge D leads directly from the other end of this manifold. The manifold 8 is placed in communication with the manifold 7, by a plurality of pipes 9 all of which are disposed in an inclined plane, said pipes being preferably disposed in converging pairs as shown.

The advantage of the heater constructed from the manifolds and pipes as shown, is that the water heated in any of said pipes can immediately rise to the discharge pipe and any relatively cool water may fall back toward the inlet pipe to be reheated.

Between the pipes 9 are a plurality of sun-heated plates 10 preferably formed of copper, there being one plate between the pipes of each of the above-named pairs. The longitudinal edges of these plates are in snug contact with the pipes to conduct heat to the latter and it will be observed that each plate 10 is bent into substantially V-shape in transverse section, one arm $10^a$ of the V being relatively short while the other arm $10^b$ is comparatively long. The longer arm $10^b$ is connected with the uppermost pipe of the pair.

The inner opposed sides of the pipes 9 are provided with longitudinal external grooves 11 receiving the edges of the plates 10. The bending of these plates into the shape shown or other appropriate shape, imparts transverse resiliency to them and this resiliency is utilized to tightly hold the plate edges in the grooves 11. This construction also readily permits any relative movement of plates and pipes which may be required incident to expansion and contraction.

It will be seen from the foregoing that I have not only provided a new and improved solar water heating system, but that I have also provided an unusually efficient sun-heated water heater which, while preferably employed in said system, is readily adaptable to other systems, for instance, one of conventional form in which circulation of water continually takes place through the heater and the storage tank.

The general construction shown and described is preferably followed. However, within the scope of the invention as claimed, variations may be made.

I claim:—

1. A solar hot water system comprising a sun-heated water-heater having an inlet for water under pressure, and an outlet, a hot water storage tank into which said outlet discharges, the upper portion of said tank constituting an air chamber in which air is compressed by the water under pressure entering the tank, valve means capable of preventing flow of water under pressure from said heater to the tank, and a hot water discharge line from the lower portion of said tank, the compressed air in said chamber serving to discharge the hot water under pressure through said discharge line after closing of said valve means.

2. A sun-heated water heater embodying two laterally spaced sun-heated pipes having external longitudinal grooves in their inner opposed portions, and a sun-heated plate between said pipes having its edges received snugly in said grooves, said plate being bent into angular form in transverse section to render it transversely resilient, the transverse resiliency thus imparted to the plate serving to hold its edges in said grooves and in tight contact with the pipes.

3. A sun-heated water heater comprising two spaced inclined manifolds, a water supply pipe discharging into the lower end of one of said manifolds, a hot water discharge pipe leading from the upper end of said one manifold, and a plurality of sun-heated pipes connecting the two manifolds with each other, said pipes being disposed in pairs, with the pipes of each pair converging throughout their lengths toward one of said manifolds and diverging throughout their lengths toward the other of said manifolds.

In testimony whereof I have hereunto affixed my signature.

ROBERT W. EATON.